United States Patent
Wang et al.

(10) Patent No.: US 11,240,779 B2
(45) Date of Patent: Feb. 1, 2022

(54) METHODS OF IDENTIFYING AERIAL USER EQUIPMENT IN CELLULAR NETWORKS

(71) Applicant: Telefonaktiebolaget LM Ericsson (publ), Stockholm (SE)

(72) Inventors: Yi-Pin Eric Wang, Fremont, CA (US); Mattias Bergström, Sollentuna (SE); Sebastian Euler, Storvreta (SE); Shiwei Gao, Nepean (CA); Xingqin Lin, San Jose, CA (US); Helka-Liina Määttänen, Helsinki (FI); Siva Muruganathan, Stittsville (CA); Vijaya Yajnanarayana, Bangalore (IN)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 16/620,660

(22) PCT Filed: Jun. 29, 2018

(86) PCT No.: PCT/SE2018/050711
§ 371 (c)(1),
(2) Date: Dec. 9, 2019

(87) PCT Pub. No.: WO2019/004925
PCT Pub. Date: Jan. 3, 2019

(65) Prior Publication Data
US 2020/0187151 A1   Jun. 11, 2020

Related U.S. Application Data

(60) Provisional application No. 62/527,099, filed on Jun. 30, 2017.

(51) Int. Cl.
*H04W 64/00* (2009.01)
*H04W 36/00* (2009.01)
*H04W 56/00* (2009.01)

(52) U.S. Cl.
CPC ..... *H04W 64/006* (2013.01); *H04W 36/0058* (2018.08); *H04W 56/003* (2013.01)

(58) Field of Classification Search
CPC ...... C04B 2235/3203; C04B 2235/349; C04B 2235/604; C04B 2235/656;
(Continued)

(56) References Cited

U.S. PATENT DOCUMENTS 6,999,780 B1 * 2/2006 Zhao .................... H04B 1/3805
                                                  455/456.5
9,537,561 B1   1/2017 Kotecha et al.
(Continued)

FOREIGN PATENT DOCUMENTS

WO   2014013187 A1   1/2014
WO   2015123623 A1   8/2015

OTHER PUBLICATIONS

International Search Report and Written Opinion of the International Searching Authority dated Nov. 9, 2018 issued in PCT Application No. PCT/SE2018/050711, consisting of 8 pages.
(Continued)

*Primary Examiner* — Lester G Kincaid
*Assistant Examiner* — Dung L Lam
(74) *Attorney, Agent, or Firm* — Christopher & Weisberg, P.A.

(57) ABSTRACT

A method and one or more network nodes for use in a wireless communication network to determine whether a wireless device is aerial. The one or more one or more network nodes communicate with the wireless device to instruct to report one or more metrics of wireless device parameters. The one or more network nodes receives from the wireless device a report of the metrics and then compares the reported metrics to terrestrial metrics to determine whether the wireless device is aerial.

17 Claims, 5 Drawing Sheets

(58) Field of Classification Search
CPC .... C04B 2235/6562; C04B 2235/6565; C04B 2235/6567; C04B 2235/666; C04B 2235/77; C04B 2235/80; C04B 2235/96; C04B 2235/9607; C04B 35/19; C04B 35/62615; C04B 35/62675; C04B 35/645; B64C 2201/122; B64C 39/024; H04B 15/00; H04B 17/345; H04B 7/18506; H04B 1/0004; H04B 1/001; H04B 1/0031; H04W 16/14; H04W 24/10; H04W 36/0058; H04W 4/00; H04W 52/143; H04W 52/146; H04W 52/241; H04W 52/242; H04W 52/248; H04W 52/325; H04W 56/003; H04W 64/006; H04W 84/042; H04L 43/065

See application file for complete search history.

(56) References Cited

U.S. PATENT DOCUMENTS

| | | | |
|---|---|---|---|
| 2005/0014499 A1 | 1/2005 | Knoblach et al. | |
| 2005/0176441 A1* | 8/2005 | Jurecka | G01S 19/47 455/456.1 |
| 2007/0155329 A1* | 7/2007 | Mehrabanzad | H04B 7/18506 455/63.1 |
| 2011/0319088 A1* | 12/2011 | Zhou | H04W 52/343 455/442 |
| 2013/0329772 A1* | 12/2013 | Wernersson | H04B 7/0469 375/219 |
| 2015/0304885 A1 | 10/2015 | Jalali | |
| 2017/0006448 A1* | 1/2017 | Igumnov | H04W 4/029 |
| 2017/0041763 A1* | 2/2017 | Jalali | H04W 64/003 |
| 2018/0115387 A1* | 4/2018 | Takeda | H04L 1/08 |
| 2018/0293897 A1* | 10/2018 | Murphy | G05D 1/0022 |
| 2018/0324662 A1* | 11/2018 | Phuyal | H04B 7/15 |
| 2019/0090180 A1* | 3/2019 | Judd | H04W 64/00 |
| 2020/0187151 A1* | 6/2020 | Wang | H04W 64/006 |
| 2020/0260404 A1* | 8/2020 | Vrind | H04W 74/002 |

OTHER PUBLICATIONS

European Search Report and Written Opinion dated Jan. 28, 2021 for International Application No. 18823506.3, consisting of 11-pages.
3GPP TSG-RAN WG2 #100 R2-1713451; Title: Summary on [99b#61][LTE/UAV] Identify potential solutions on mobility enhancement; Agenda Item: 9.4.4.3; Source: Ericsson (Rapporteur); Document for: Discussion and Decision; Date and Location: Nov. 27-Dec. 1, 2017, Reno, Nevada, USA, consisting of 23-pages.
3GPP TSG-RAN WG2 Meeting #98 R2-1705427; Title: Potential enhancements for HO; Agenda Item: 9.4.4; Source: Ericsson; Document for: Discussion and Decision; Date and Location: May 15-19, 2017, Hangzhou, China, consisting of 3-pages.
3GPP TSG-RAN2 Meeting #98 R2-1705999; Title: Proposal of potential LTE enhancements for Aerial Vehicles; Agenda Item: 9.4.4; Source: KDDI; Document for: Discussion & Decision; Date and Location: May 15-19, 2017, Hangzhou, China, consisting of 5-pages.
3GPP TSG-RAN WG2 Meeting #99 R2-1708664; Title: Identify certification for drones; Agenda Item: 9.4.5; Source: Ericsson; Document for: Discussion and Decision; Date and Location: Aug. 21-25, 2017, Berlin, Germany, consisting of 3-pages.
3GPP TSG-RAN WG2 Meeting #98 R2-1705660; Title: Aerial Traffic Handling using Positioning Identification; Agenda Item: 9.4.3; Source: LG Electronics Inc.; Document for: Discussion and Decision; Date and Location: May 15-19, 2017, Hangzhou, China, consisting of 2-pages.

\* cited by examiner

METHODS OF IDENTIFYING AERIAL USER EQUIPMENT IN CELLULAR NETWORKS

CROSS-REFERENCE TO RELATED APPLICATIONS

This application is a Submission Under 35 U.S.C. § 371 for U.S. National Stage Patent Application of International Application No.: PCT/SE2018/050711, filed Jun. 29, 2018 entitled "METHOD AND NETWORK NODES FOR DETERMINING WHETHER A WIRELESS DEVICE IS AERIAL," which claims priority to U.S. Provisional Application No. 62/527,099, filed Jun. 30, 2017," the entireties of both of which are incorporated herein by reference.

TECHNICAL FIELD

Embodiments herein relate to methods and nodes for determining whether a wireless device in a wireless communication network is aerial.

BACKGROUND

Communication devices such as wireless communication devices, that simply may be named wireless devices, may also be known as e.g. user equipments (UEs), mobile terminals, wireless terminals and/or mobile stations. A wireless device is enabled to communicate wirelessly in a wireless communication network, that alternatively e.g. may be named cellular communication network, wireless communication system, radio communication system, cellular radio system, cellular network or cellular communication system. The communication may be performed e.g. between two wireless devices, between a wireless device and a regular telephone and/or between a wireless device and a server via a Radio Access Network (RAN) and possibly one or more core networks, comprised within the cellular communication network. The wireless device may further be referred to as a mobile telephone, cellular telephone, laptop, Personal Digital Assistant (PDA), tablet computer, just to mention some further examples. Wireless devices may be so called Machine to Machine (M2M) devices or Machine Type of Communication (MTC) devices, i.e. devices that are not associated with a conventional user. The wireless device may be, for example, portable, pocket-storable, hand-held, computer-comprised, or vehicle-mounted mobile device, enabled to communicate voice and/or data, via the RAN, with another entity, such as another wireless device or a server. The wireless communication network covers a geographical area in which radio coverage is provided and enables wireless devices to connect and communicate in the network. The area may be divided into subareas, e.g. cell areas, wherein each subarea is served by at least one base station, or Base Station (BS), e.g. a Radio Base Station (RBS), which sometimes may be referred to as e.g. "eNB", "eNodeB", "NodeB", "B node", or BTS (Base Transceiver Station), gNB, depending on the technology and terminology used. The base stations may be of different classes such as e.g. macro eNodeB, home eNodeB or pico base station, based on transmission power and thereby also cell size. The base station at a base station site typically provides radio coverage for one or more cells. A cell is typically identified by one or more cell identities and may be associated with a geographical area where radio coverage for that cell is provided by the base station at the base station site. Cells may overlap so that several cells cover the same geographical area. By the base station providing or serving a cell is meant that the base station provides radio coverage such that one or more wireless devices located in the geographical area where the radio coverage is provided may be served by the base station in said cell. When a wireless device is said to be served in or by a cell this implies that the wireless device is served by the base station providing radio coverage for the cell. One base station may serve one or several cells. Further, each base station may support one or several communication technologies. The base stations communicate over the air interface operating on radio frequencies with the wireless device within range of the base stations.

UMTS is a 3G, or third generation, mobile communication system, which evolved from Global System for Mobile communications (GSM) that belongs to the so called 2nd generation or 2G. UMTS provides improved mobile communication services based on Wideband Code Division Multiple Access (WCDMA) access technology. UMTS Terrestrial Radio Access Network (UTRAN) is essentially a radio access network using wideband code division multiple access for wireless devices. High Speed Packet Access (HSPA) is an amalgamation of two mobile telephony protocols, High Speed Downlink Packet Access (HSDPA) and High Speed Uplink Packet Access (HSUPA), defined by 3GPP, that extends and improves the performance of existing 3G mobile telecommunication networks utilizing the WCDMA. Such networks may be named WCDMA/HSPA.

The 3rd Generation Partnership Project (3GPP) has further evolved the UTRAN and GSM based radio access network technologies, for example into evolved UTRAN (E-UTRAN) used in Long Term Evolution (LTE) that is a 4G, i.e. $4^{th}$ generation, mobile communication system.

3GPP is also involved in standardizing yet another new generation wide area networks, which may be referred to as fifth generation (5G). 5G New Radio (5G NR), or simply NR, is the new radio air interface being developed for 5G. However, NR may also be used to denote 5G in general. Another acronym being used to denote 5G is Next Generation (NG).

In the field of aerial devices, wide-area connectivity is viewed as a means to significantly enhance control and safety during in-flight missions. With the increased interests of drone technology, there is a concurrent increase interest in using cellular networks for offering wide-area connectivity to drones that are flying. As a result, in March 2017, 3GPP had approved a study item on enhanced LTE support for aerial vehicles.

While cellular connectivity of a flying drone is technologically feasible, the capacity in which the drone, and, as extended, an aerial UE, i.e. an aerial wireless device, consumes would displace the overall network by a substantial degree. This is due, in part, to signal interference and performance reduction of network cells when an aerial UE is placed at a high altitude, thus resulting in line-of-sight links to many network nodes.

SUMMARY

In view of the above, an object is to provide one or more improvements regarding use of aerial wireless devices in wireless communication networks.

According to a first aspect of embodiments herein, the object is achieved by a method for use in a wireless communication network, for determining whether a wireless device is aerial. The method comprises to communicate with the wireless device to instruct to report one or more metrics of wireless device parameters and receive from the wireless device a report of the metrics. The reported metrics are then compared to terrestrial metrics to determine whether the wireless device is aerial.

According to a second aspect of embodiments herein, the object is achieved by one or more network nodes configured to be operative in a wireless communication network and further configured to communicate with a wireless device to instruct to report one or more metrics of wireless device parameters. The one or more network nodes receive, from the wireless device, a report of the metrics and then compare the reported metrics to terrestrial metrics to determine whether the wireless device is aerial.

Embodiments herein are based on realization that various metrics already available to conventional, grounded or terrestrial wireless devices, can be used to determine whether a wireless device is aerial, or not. By e.g. instructing a wireless device to provide these metrics and then compare to terrestrial metrics, i.e. metrics associated with a wireless device that is terrestrial and thus not aerial, which is the conventional case, it can be determined if the wireless device is aerial. It may e.g. be known from measurements, theory and/or experience and/or other knowledge that an aerial wireless device will result in certain metrics, e.g. that fulfil certain criteria, and that is indicative and/or identify the wireless device as aerial, e.g. since a grounded wireless device cannot produce such metrics and/or that the metrics can only or reasonably only be explained by that the wireless device is aerial.

When a wireless device can be determined, i.e. identified, to be aerial by the wireless communication network, it enables e.g. certain control by the wireless communication network and/or network optimization to better handle and support aerial wireless devices. Identification of aerial wireless devices can also be used to support different pricing schemes between aerial and regular, ground wireless devices. Hence, embodiments herein provide improvements regarding use of aerial wireless devices in wireless communication networks.

BRIEF DESCRIPTION OF THE DRAWINGS

For a more complete understanding of the embodiments and their features and advantages, reference is now made to the following description, taken in conjunction with the accompanying drawings, which are briefly described in the following.

DETAILED DESCRIPTION

As a development towards embodiments herein, the situation indicated in the Background will first be further elaborated upon.

From an economic point of view, cellular operators may be interested in a different class of pricing scheme when UEs are aerial, i.e., connected to a network at a high altitude. To support such pricing scheme differentiation, it becomes desirable that a network can identify high-altitude UEs.

Furthermore, many radio control algorithms, functions, and the like, may be configured in an aerial or high altitude UE based on different parameters from that of UEs that are not high altitude. "High altitude" is considered in this disclosure to be the altitude of a UE or other entity at least 35 m, or in the range of 35 m-500 m, from ground level. Such functional differences may include, but are not limited to: power control; mobility management; or radio resource allocation, etc. The algorithms or functions may be optimized to fit within the context of high-altitude UEs. To facilitate such optimizations, it further becomes essential for the network to identify a UE that is high altitude.

The present disclosure imparts various ways for identifying and distinguishing aerial/high-altitude user equipment in a cellular network. Different strategies for aerial UE detection are described herein. The ways and strategies described herein may be utilized to support different pricing schemes between aerial and regular, ground UEs and also to facilitate network optimizations. For example, proposed methods in the present disclosure relate to one or more of the following metrics to determine whether a UE is high altitude or aerial:

Time-of-arrival (ToA) estimate

Timing Advance (TA) adjustment value

Rise-over-thermal (RoT) level and Overload Indicator (OI) in one or more cells

Throughputs (or spectral efficiency) in one or more cells

UE mobility measurement reports such as Reference Signal Received Power (RSRP) or Reference Signal Received Quality (RSRQ)

Handover history

Handover frequency

Observed Time Difference of Arrival (OTDOA) measurements

RSRP or RSRQ mapping data

Doppler Estimation

Beam index, such as Channel State Information-Reference Signals (CSI-RS) Resource Indication (CRI)

In view of the aforementioned, a network node or entity in a cellular network may identify an aerial or high-altitude UE and then thus configure network control algorithms for such a UE to enhance the performance as experienced by the UE and/or network performance. The present disclosure further supports the possibility for a network operator to introduce a different pricing scheme for such UEs, e.g. UEs in Unmanned Aerial Vehicles (UAVs), i.e. UAV UEs.

The present disclosure includes describing systems and methods for identifying aerial and high-altitude UEs in a communication network. Identifying an aerial UE is first described with respect to UEs that may be considered as low altitude or "ground UE."

Figure 1:
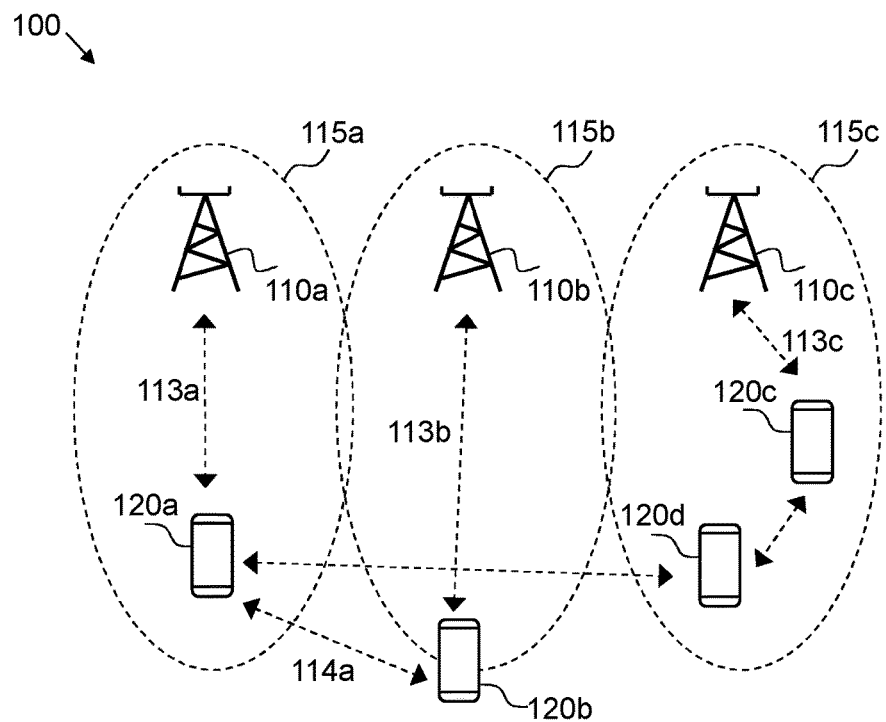
FIG. 1 is a block diagram schematically illustrating an example wireless communication network.

FIG. 1 is a block diagram illustrating a wireless network 100 being an example of a wireless network involving ground entities. The wireless network 100 includes one or more wireless devices 120a-d, such as mobile phones, smart phones, laptop computers, tablet computers, MTC devices, V2X devices, or any other devices that can provide wireless communication, and a plurality of network nodes 110a-c, such as base stations or eNBs. A wireless device, e.g. the wireless devices 120a-c, may also be referred to as a UE(s). In the shown example, the network nodes 110a-c serves coverage areas, respectively, also referred to as cells 115a-c.

In general, one or more wireless devices, such as the wireless devices 120a-d, that are within coverage of one or more network nodes, e.g. the network nodes 110a-c, such as within cells 115a-c served by the network nodes 110a-c, respectively, may communicate with the network node serving it by transmitting and receiving wireless signals 113a-c. For example, the wireless devices 120a-c and the network node 110a-c, respectively, may communicate wireless signals containing voice traffic, data traffic, and/or control signals.

A network node, e.g. any one of the network nodes 110a-c communicating voice traffic, data traffic, and/or control signals to a wireless device, e.g. any one of the wireless devices 120a-c, may be referred to as a serving network node for the wireless device. Communication between a wireless device, e.g. any one of the wireless devices 120a-c, and a network node, e.g. any one of the network nodes 110a-c, may be referred to as cellular communication. Wireless signals, e.g. wireless signals 113a-c, may include both downlink (DL) transmissions, i.e. in direction from a network node to a wireless device and uplink (UL) transmissions, i.e. in direction from a wireless device to a network node. In LTE, the interface for communicating wireless signals between a network node and a wireless device may be referred to as a Uu interface.

Each of the network nodes 110a-c may have a single transmitter or multiple transmitters for transmitting signals, e.g. the wireless signals 113a-c, to wireless devices, e.g. the wireless devices 120a-c. In some embodiments, one or more of the network nodes 110a-c may comprise respective multi-input multi-output (MIMO) system. Similarly, each of the wireless devices 120a-c may have a single receiver or multiple receivers for receiving signals, e.g. the wireless signals 113a-c, from network nodes, e.g. the network nodes 110a-c or other wireless devices, e.g. another of the wireless devices 120a-c.

Wireless devices, e.g. the wireless devices 120a-d, may additionally communicate directly with each other in some operation modes, e.g. according to so called Device to Device (D2D) operation, by transmitting and receiving wireless signals. For example, as illustrated in the figure, the wireless device 120a may communicate with the wireless device 120b using a wireless signals 114a. Such wireless signal may also be referred to as a sidelink, or in other words, wireless communication over a sidelink that thus may correspond to a direct wireless communication link and/or interface for such communication between wireless devices. Communication between two wireless devices, such as the wireless devices 120a-b, may also be referred to as D2D communication or sidelink communication. In LTE, the interface for communicating wireless signals between wireless devices, such as the wireless signals 114a directly between wireless devices 120a and 120b, may be referred to as a PC5 interface.

Wireless signals, e.g. the wireless signals 113a-c, may be transmitted on time-frequency resources. The time-frequency resources may be partitioned into radio frames, subframes, slots, and/or mini-slots. Data may be scheduled for transmission based on the partitions. For example, data transmissions may be scheduled based on subframe, slot, or mini-slot.

A wireless device, e.g. any one of the wireless devices 120a-d, network node, e.g. any one of the network nodes 110a-c, or any other component of a network, e.g. the wireless network 100, that transmits wireless signals may be referred to as a wireless transmitter. A wireless device, e.g. any one of the wireless devices 120a-d, a network node, e.g. any one of the network nodes 110a-c, or any other component of a network, e.g. the wireless network 100, that receives wireless signals may be referred to as a wireless receiver.

Figure 2:
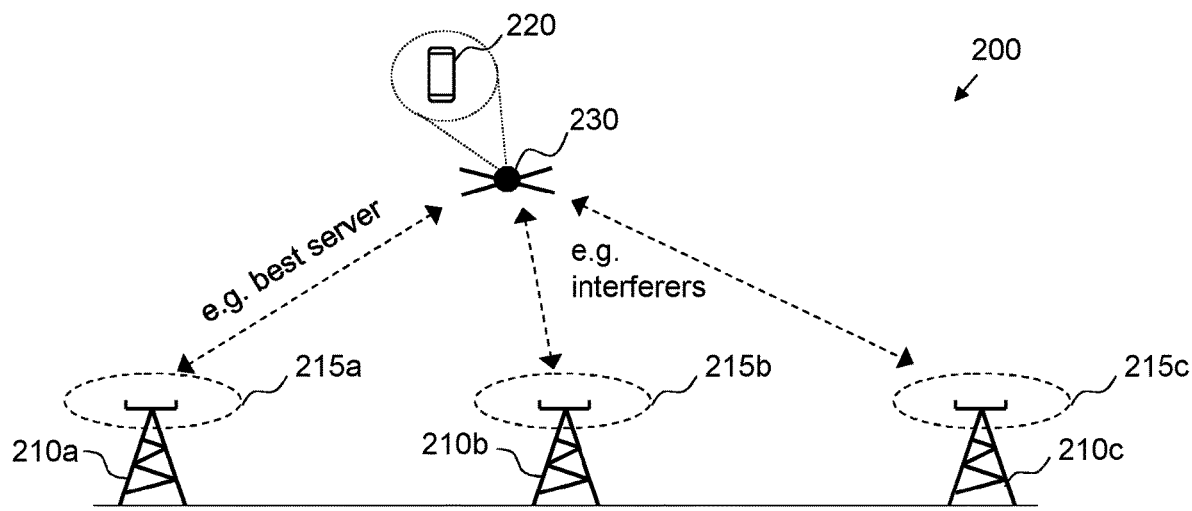
FIG. 2 is another block diagram schematically illustrating an example wireless communication network.

FIG. 2 is a block diagram illustrating a wireless network 200, i.e. a a wireless communication network, according to some embodiments of the present disclosure. The wireless network 200 includes one or more network nodes, e.g. network nodes 210a-c, which produce coverages of one or more cells, e.g. cells 215a-c, respectively. The network nodes 210a-c and the cells 215a-c may correspond to the network nodes 110a-c and cells 115a-c, respectively. A wireless device 220 is shown in an aerial situation, i.e. is a wireless devise that is being aerial, and may thus be named an aerial wireless device or aerial UE. The wireless device 220 is shown comprised in an UAV 230 such as a drone is depicted and exemplified in the figure, but it may be understood that other aerial and high-altitude devices or vehicles may be used. The aerial wireless device 210 may thus correspond to a wireless device, e.g. any one of the wireless devices 120a-d or another wireless device, that has been attached, integrated, appended, and/or associated, etc. with the UAV 230 such that the wireless device 220 thereby becomes a high-altitude or an aerial wireless device, e.g. "aerial UE" when the UAV 230 is aerial. Connection may be attempted by the wireless device 220 when it is aerial to one or more of the network nodes 210a-c, in consideration of the aerial wireless device 220's height with respect to buildings and trees.

With respect to FIG. 2, an issue is that when an aerial UE reaches a certain altitude with respect to a network node, the network node, e.g. eNB(s), directly underneath the associated UAV may not be the most ideal selection of network node, i.e. for serving the aerial UE. For example, although it may have been the best selection at ground level, the network node 210b may not be the best selection at higher altitude for the aerial wireless device 220 although it is located directly under it. That is, the signal quality of an eNB directly underneath an UAV with an aerial wireless device may not be necessarily better than that of an eNB farther away from the UAV. This may be due, in part, to the feature of the network node antennas; eNB antennas may be typically down-tilted such that the main antenna beams point to an elevation angle below the horizon. Often, only antenna sidelobes point at an angle above the eNBs. Experimental results have yielded that often an aerial UE associated with an UAV will have a serving cell that is far away from the UAV itself. This may be due, in part, to the fact that a network node, here radio network node such as an eNB, i.e. base station, that is farther away with respect to the UAV has a lower antenna elevation angle and thus a lower cell angle to the drone compared with that of a network node directly underneath the UAV.

Another aspect associated with an aerial UE is high interference level. An aerial UE above building and tree lines, e.g. shown in FIG. 2, has a Line-of-Sight (LoS) propagation condition to many eNBs, i.e. base stations. This results in a lower path loss, which means that, in the downlink, the aerial UE experiences high received signal power levels from many cells and e.g. base stations, and, in the uplink, its signal is received in many cells and e.g. by many base stations at high received power levels. Interference is therefore a problem when an aerial UE is connected to a cellular network. Hence, as illustrated in the figure, if wireless signals from one of the network nodes, e.g. the network node 215a, offers a best connection, or best server for serving the aerial wireless device 220, wireless signals from other network nodes, e.g. the network nodes 210a-b, may be substantial interferers.

Figure 3:
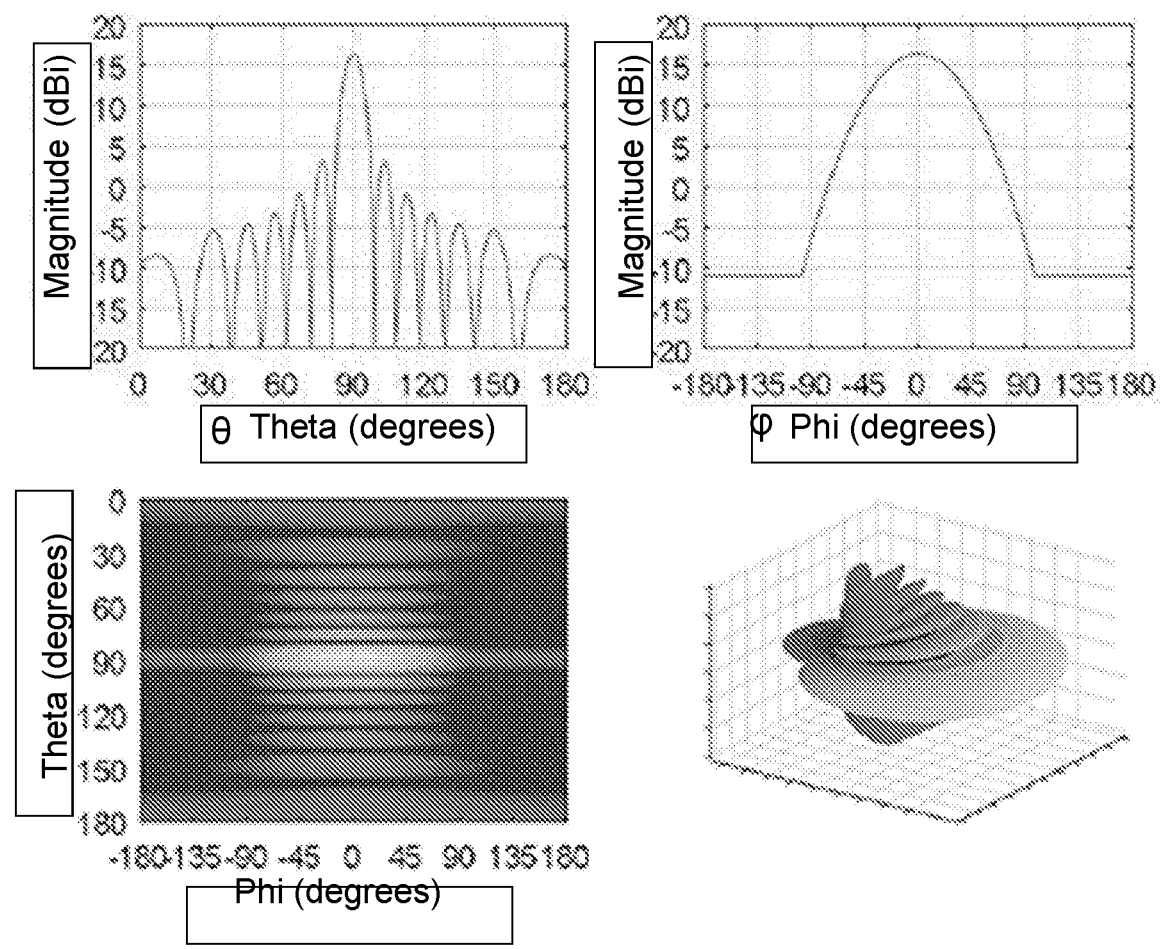
FIG. 3 illustrates an example 3D antenna pattern at an eNB.

FIG. 3 illustrates an example 3D antenna pattern at an eNB, i.e. a network node, wherein theta is the elevation angle where 90 degree points to the horizon. It can be seen from the figure that the antenna gain varies according to the elevation angle, here theta, and rolls off from 90 degree downwards or upwards, i.e. the magnitude, or coverage, of a cell, or in other strength of wireless signals of the cell, decreases as the angle deviates more from 90 degrees. For example, above the horizon, a larger elevation angle may give rise to a lower antenna. In practice, the eNB antenna is down-tilted, with the maximum antenna gain at an elevation angle slightly below 90 degrees. For example, a 3 degree antenna down-tile means that the maximum antenna gain occurs at 87 degrees. In essence, the 3D antenna pattern is shifted by 3 degrees in the vertical dimension.

In view of the above, embodiments herein may be described to be based on that serving cell and interference characteristics can be exploited to help identify aerial wireless devices. In particular the following metrics may be used in identifying or determining when user equipment is airborne or not:
  (1) Time-of-arrival (ToA) estimate and Timing advance (TA) adjustment value,
  (2) Rise-over-thermal (RoT) level and overload indicator (OI) in one or more cells,
  (3) Throughputs (or spectral efficiency) in one or more cells,
  (4) Mobility Measurement Reports for UEs such as Reference Signal Received Power (RSRP) or Reference Signal Received Quality (RSRQ),
  (5) Handover history and/or handover frequency,
  (6) OTDOA measurements,
  (7) RSRP or RSRQ mapping data,
  (8) Doppler estimation,
  (9) Beam index such as Channel State Information-Reference Signals (CSI-RS) Resource Indicator (CRI).

For example, the metrics (2) and (3) can be used as an indication of possible presence of airborne, i.e. aerial, wireless devices in a cellular network, while the other metrics may be used collectively to verify whether an individual wireless device is an aerial wireless device.

Through Radio Resource Control (RRC), an eNB may instruct a wireless device to provide it with specific parameters or metrics. After receiving the information from the wireless device UE, the eNB may make a determination of whether or not the UE is aerial or high altitude. After said determination that the UE is high altitude and/or aerial, the network node may adapt network algorithms and/or send a signal to the UE to adapt settings and algorithms to adjust for improvement, e.g. to aerial optimization.

The following is an explanation of the metrics.

1. Time-of-arrival (ToA) Estimate and Timing Advance (TA) Adjustment Value

In an LTE network, time-of-arrival (ToA) estimation is used to determine the TA adjustment value. Keeping track of TA adjustment value is important for the performance of LTE uplink. It is desirable to align the received signals from UEs co-scheduled in the same subframe to be within the cyclic prefix so that the orthogonality between these uplink signals can be better preserved. Thus, ToA estimate and TA adjustment value are readily available in the serving cell. Both the ToA estimate and TA adjustment value reflect the round-trip propagation delay between a UE and the eNB. As mentioned earlier, an aerial UE tends to connect to a farther away cell. Thus, both ToA estimate and TA adjustment values can be used to identify an aerial UE. The UEs who have higher TA adjustment values compared to the nominal distribution of TA adjustment value in a specific cell can be an indication that such UEs are aerial UEs. For example, in cell planning there will be a maximum TA value corresponding to the terrestrial cell edge UL/DL coverage. If the value required by the UE exceeds this value, the UE is likely a flying drone UE.

ToA estimation is done in LTE over a Physical Random Access CHannel (PRACH), uplink Sounding Reference Signal (SRS), or data channel. The ToA estimated during the initial access over PRACH generally reflects the round trip propagation delay and a large TA estimated over initial PRACH is a good indication of a faraway UE.

If an eNB suspects that there may be airborne UEs as indicated by factors discussed later below, the eNB may request a UE to send a PRACH signal for ToA measurement in order to determine whether the UE is a possible aerial UE.

2. Rise-over-Thermal (RoT) level and Overload Indicator (OI) in one or more cells As mentioned earlier, an aerial UE could cause uplink interference in many cells. Thus, RoT in one or more cells can serve as a trigger to start the process of searching and identifying an aerial UE. If the network finds that RoT in many cells are higher than the nominal values in these cells, it can start the process of searching and identifying an aerial UE. For example, the network may configure certain reporting from the UEs such as certain event triggered RSRP/RSRQ reporting. RoT is often used to set the OI that is used for supporting Inter-Cell Interference Coordination (ICIC) in an LTE network. The OI signal is used by an eNB to indicate to other eNBs about its measured interference level. Thus, the OI signals in one or more cells can also be used as a trigger to start the process of searching and identifying an aerial or high altitude UE.

3. Throughputs (or spectral efficiency) in one or more cells

High interference levels cause cell throughput reduction. Thus, the throughputs in one or more cells can be used as an indication of the presence of aerial UEs. Throughput can be normalized by the amount of radio resource utilization, and this gives spectral efficiency. The network can compare the throughput, or spectral efficiency, in one or more cells with the nominal distributions in these cells. If the comparison indicates a considerably lower level, there could be aerial UEs connected to the network. The network can subsequently start the process of searching and identifying aerial UEs.

4. Mobility Measurement Reports

Mobility measurement reports typically capture RSRP and/or RSRQ values of serving and neighboring cells. High RSRP values to many cells indicate that the UE has low path loss to many cells. Such information itself may already be an indication that the UE is an aerial UE. Furthermore, RSRP measurements with respect to the physical location of the measured cells may be used to infer the path loss exponent or path loss slope. A smaller path loss exponent may indicate the UE has Line of Sight (LoS) propagation condition, which may be a result of high UE altitude. Furthermore, RSRQ in the mobility report may be used. An aerial UE, while having good RSRP in many cells due to LoS propagation condition, likely has low RSRQ in many cells due to interference. Comparing RSRQ with RSRP measurements could determine whether a UE is airborne.

5. Handover history and handover frequency

Due to the aforementioned serving cell characteristics of aerial UEs, both handover history and handover frequency can be used in determining whether a UE is at high altitude or on the ground. Since an aerial UE often connects to a farther away eNB, its serving cell changing pattern may not follow a contiguous cell pattern. Furthermore, an aerial UE may have more frequent or less frequent handovers compared to ground UEs. Whether the handover events are more frequent or less frequent for an aerial UE, relative to ground UEs, depends on both mobility configuration and the UE speed. Regardless, the handover frequency will be different from that experienced by UEs on the ground. For example, a UE moving at high speed on the ground may experience more frequent handovers compared to an aerial UEs. Thus, UE speed, or equivalently Doppler value, may additionally be used in determining whether a UE is airborne or at high altitude.

6. OTDOA Measurements

OTDOA is a feature in e.g. LTE networks to support downlink based positioning. When a UE is being flagged as a potentially aerial UE by the network, the network can trigger UE's OTDOA measurement. The OTDOA positioning measurement report from the UE includes information about the UE altitude. The UE altitude information together with horizontal positioning information, also typically included in a UE OTDOA report, can be used to differentiate e.g. an aerial, such as a drone UE, from UEs that are located on high-floors in a high-rise building. For example, a high altitude at horizontal positions known for not having a high-rise building may indicate that the UE is airborne. OTDOA measurements can also be used in combination with RSRP reports to differentiate a drone UE from UEs who are located indoors. The indoor UEs will have a much poorer RSRP compared to drone UEs due to higher building penetration loss.

7. RSRP or RSRQ Mapping Data 2D or 3D RSRP or RSRQ mapping data can be collected. Once the network receives RSRP and RSRQ measurements from the UE, it can compare them to the mapping data to determine whether a UE is airborne or not.

8. Doppler estimation

Doppler frequency can be estimated for a UE based on uplink reference signals such as SRS and Demodulation Reference Signals (DMRS). High Doppler frequency is an indication of high UE mobility. Airborne UEs are generally moving faster than ground UEs in at least urban cells, it can be used in combination with other metrics to identify an airborne UE.

9. Beam Index, such as CSI-RS Resource Indicator (CRI)

The eNBs capable of, or complying with, LTE Release-13 or later can configure the UEs with a so called K>1 CSI-RS resource. The eNB can transmit CSI-RS in each of these resources with a different vertical direction. Each UE will measure the CSI and report a CSI-RS Resource Indicator (CRI) along with other CSI components such as Precoding Metric Indicator (PMI), Channel Quality Indicator (COI), etc. If a UE reports a CRI that corresponds to a CSI-RS resource that has an associated vertical direction above the horizon, then this UE according to some embodiments herein is identified as a potential aerial or drone UE. This can be combined with other metrics as well.

The descriptions above elaborate on how the various metrics or measurements may be used to determine whether a UE is airborne and/or to trigger a process of searching or identifying aerial UEs. Additional aspects are disclosed in the following.

The network may not always search for aerial UEs all the time. The search process may be triggered only when certain conditions are met or occur. For example, the search process may be triggered by high RoT levels or low throughput or spectral efficiency in a number of cells.

The search process may first identify a suspected aerial UE and follow this up by a verification step that is applied only to a UE suspected to be aerial. For example, the network may configure such UEs with certain measurements, which may be event triggered or periodical. Another example is that the verification process may order the UE to send a random access preamble. The network may configure many cells to receive such a preamble in order to measure ToA and TA in many cells and that then thus may be used for the verification. In another example, the network may configure the UE to send periodic uplink reference signals, e.g. Sounding Reference Signal (SRS) to facilitate measurement of uplink channel quality, e.g. RSRP or RSRQ. These statistics, i.e. ToA, TA, RSRP and/or RSRQ, may then be used to verify whether a suspected UE is indeed airborne, i.e. aerial.

One challenge may be to differentiate a flying, i.e. an actual aerial, UE from UEs on e.g. high floors. Doppler estimation may be used to facilitate such differentiation. For example, a UE at high altitude moving at speed faster than in a domain of pedestrian speed is most likely a flying UE.

After identifying a UE as aerial, the network can check whether such a UE is certified to connect to the network while airborne based on its subscription data. If the UE is certified, the network may apply the agreed tariff according to the UE contract which may include a special rate for airborne connection. If the UE is not certified for airborne connection, the network may take actions, e.g. send a warning message, disconnect the UE, throttle the UE data rate, or allocate resources only reserved for aerial UEs in all neighbor cells.

The metrics proposed above are such that are typically available according to cellular communication protocols and as such available in wireless communications networks. The UE itself may also have additional data points that can be used to help the network identify whether the UE is airborne. Such examples include (i) UE altitude and velocity information estimated based on an inertial sensor, (ii) Global Positioning System (GPS) data, and (iii) measurements based on a barometric sensor. For example, so called dead reckoning in inertial sensors may be used to identify the height and thereby if the UE is aerial or not. Furthermore, in barometric sensors, the pressure drops with altitude. This may be exploited to estimate the UE altitude. The network can query data gathered by UE sensors to facilitate identification of airborne, i.e. aerial UEs.

Figure 4:
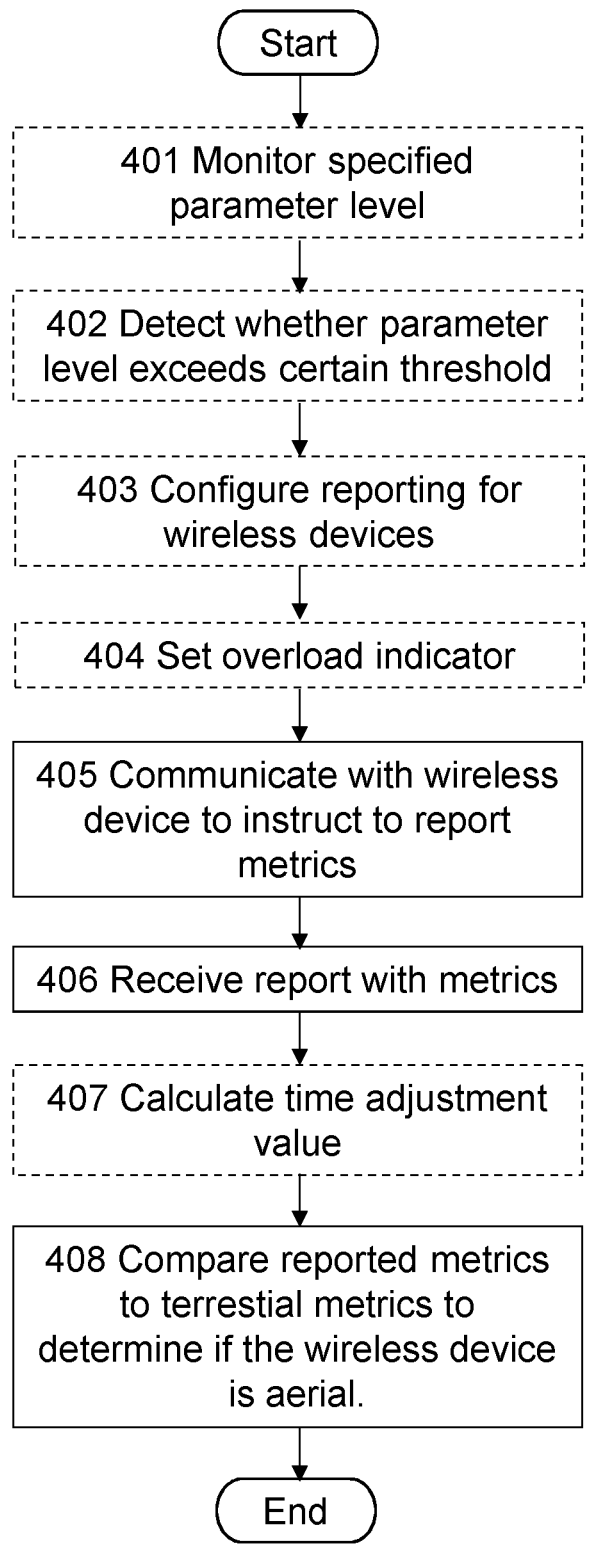
FIG. 4 is a flowchart schematically illustrating embodiments of a method.

FIG. 4 is a flowchart schematically illustrating embodiments of a method. The method is for use in, e.g. to be or is performed by, a wireless communication network, e.g. the wireless communication network 100 or wireless communication network 200. More particularly, the method is for use in one or more network nodes of the wireless communication network, such as one or more of the network nodes 110a-c and 210a-c, e.g. radio access node(s), such as a base station. The method is further, as explained below, for determining whether a wireless device, e.g. any one of the wireless devices 120a-c, 220, is aerial, or not.

For readability reasons, the wireless communication network 200 will in the following text relating to FIG. 4 be referred to as performing the method and actions thereof, but may thus, in view of the above, be replaced by the wireless communication network 200 or one or more or any one of the network nodes 110a-c and 210a-c, e.g. a base station. Correspondingly, for readability reasons, the wireless device 220 will the following text relating to FIG. 4 be used as example of the wireless device or UE, but may thus in the text be replaced by e.g. any one of the wireless devices 120a-c.

The method comprises the following actions.

Action 401

The wireless communication network 200, e.g. any one of the network nodes, 210a-c, such as said base station, may monitor specified parameter level in one or more cells, e.g. one or more of the cells 115a-c, 215a-c, provided by one or more base stations, e.g. one or more of the network nodes 110a-c, 210a-c being base stations.

In some embodiment the specified parameter level is a rise-over-thermal level or RoT level, such as a RoT level as discussed above.

Moreover, in some embodiments, the specified parameter level is a spectral efficiency parameter level.

Furthermore, in some embodiments, the specified parameter level is a RSRP parameter level and/or an RSRQ parameter level.

Action 402

Further, when Action 401 is executed, the wireless communication network 200 may further detect whether said parameter level exceeds a certain threshold, e.g. predefined or predetermined, within said one or more cells.

Action 403

Moreover, when Action 401 and Action 402 are executed, the wireless communication network 200 may configure reporting for wireless devices, e.g. for the wireless devices 120a-c, 220, served by said one or more cells.

Action 404

When Actions 401-403 are executed, and the specified parameter level may be said rise-over-thermal level, said base station may set an overload indicator, i.e. an OI, that may be such OI as discussed above, to signal to one or more cells, e.g. one or more of the cells 115a-c, 215a-c, of one or more base stations, e.g. one or more of the network nodes 110a-c, 210a-c, to detect whether wireless devices, e.g. including one or more of the wireless devices 120a-c, 220, are aerial.

As should be understood from the discussions above, the offset indicator or OI may be set based on the rise-over-thermal or RoT level, and thus the parameter level exceeding said certain threshold and/or the OI, may cause, i.e. trigger, determination whether the wireless device is aerial or not, e.g. by trigger actions in the following, such as Actions 405, 406 and 408.

Action 405

The wireless communication network 200, e.g. any one of the network nodes, 210a-c, such as said base station, communicates with the wireless device 220, to instruct to report one or more metrics of wireless device, or UE, parameters. As used herein, by wireless device, or UE, parameters is meant parameters of, relating to, or associated with, the wireless device being communicated with. Hence, in the present action, the wireless communication network 200, e.g. said base station, may instruct the wireless device 220 to report one or more metrics of wireless device parameters relating to the wireless device 220.

Action 406

The wireless communication network 200, e.g. said base station, receives from the wireless device 220, a report of said one or more metrics. The wireless communication network 200, e.g. said base station, thus receives the report from the wireless device 220 communicated with in the foregoing Action 405. The wireless device 220 may thus have reacted to one or more instructions received in the communication of Action 405 and in response to that e.g. performed actions of its own, e.g. measurements if needed, to obtain the metrics and be able to report back regarding the metrics. The report in the present action may thus be received in response to the communication in Action 405 and/or in response to receipt by the wireless device 220 of instructions to report said one or more metrics.

The metrics reported by the wireless device 220 may include at least: handover history, a handover frequency, a doppler estimation, a CSI-RI resource indicator, and/or an OTDOA measurement.

As should be understood from the discussions above, said received report of the metrics in the present action may be based on or received in response to the configured reporting of Action 403, As realized by the skilled person, said communication in Action 405 and the receipt of the metrics from the wireless device in Action 406, typically involve a network node, e.g. base station, that is serving the wireless device. This may e.g. be the network node 210a if that one is serving the wireless device 220 when it is aerial or e.g. the network node 210b if that one is serving the wireless device 220 when it was not aerial and e.g. at ground before the UAV 230 took off and become aerial.

Action 407

When the method is for use in said base station, e.g. any one of the network nodes 110a-c, 210a-c, the base station may calculate a time adjustment value of the wireless device 220 with regards to the base station, e.g. a TA adjustment value as described above.

Action 408

The wireless communication network 200, e.g. said base station, compares the reported metrics, i.e. of Action 406, to terrestrial metrics to determine whether, or if, the wireless device 220 is aerial, or not. As used herein, terrestrial metrics refers to metrics associated with wireless devices that are terrestrial and thus not aerial. Terrestrial metrics regarding wireless devices are thus metrics that conventionally are received from wireless devices that are not airborne.

In other words, the reported metrics relating to, or of, the wireless device 220 are compared to terrestrial metrics that relate to how the reported metrics should or would look like if the wireless device 220 would be terrestrial and thus not aerial. If there is a significant difference and that the difference additionally may be as expected if the wireless device would be aerial, e.g. as discussed in examples above, a conclusion from the comparison may thus be that the wireless device 220 is aerial or that it is not. For example, in the shown example of FIG. 2 the comparison should result in determination that the wireless device 200 is aerial. If the wireless device instead would be the wireless device 120a at ground level as discussed in relation to FIG. 1 or that the wireless device 220 would be in the UAV 230 on ground before it took off and became aerial, the comparison should result in determination that the wireless device 200 is not aerial, i.e. terrestrial or at ground level.

Differences and metrics that indicate and/or can be used to determine that the wireless device 200 is aerial, or not, have been indicated in the foregoing for different metrics and parameters.

In case of Action 407, i.e. if the method is for use in said base station, e.g. any one of the network nodes 110a-c, 210a-c, and the base station has calculated said time adjustment value of the wireless device 220 with regards to the base station, the comparison in the present action may comprise comparing the time adjustment value with a maximum terrestrial cell value to determine if the wireless device 220 is aerial.

As should be understood by the skilled person and as indicated above, the time adjustment value may be a TA adjustment value and/or be based on a ToA estimation. As used herein, by maximum terrestrial cell value is meant a maximal value associated with the cell provided by the base stations and that the wireless device is served in, and which value indicates a limit or threshold for a terrestrial wireless device. If the time adjustment value exceeds the maximum terrestrial cell value, this indicates a far away wireless device that may possibly only be explained by that the wireless device is an aerial wireless device.

Figure 5A:
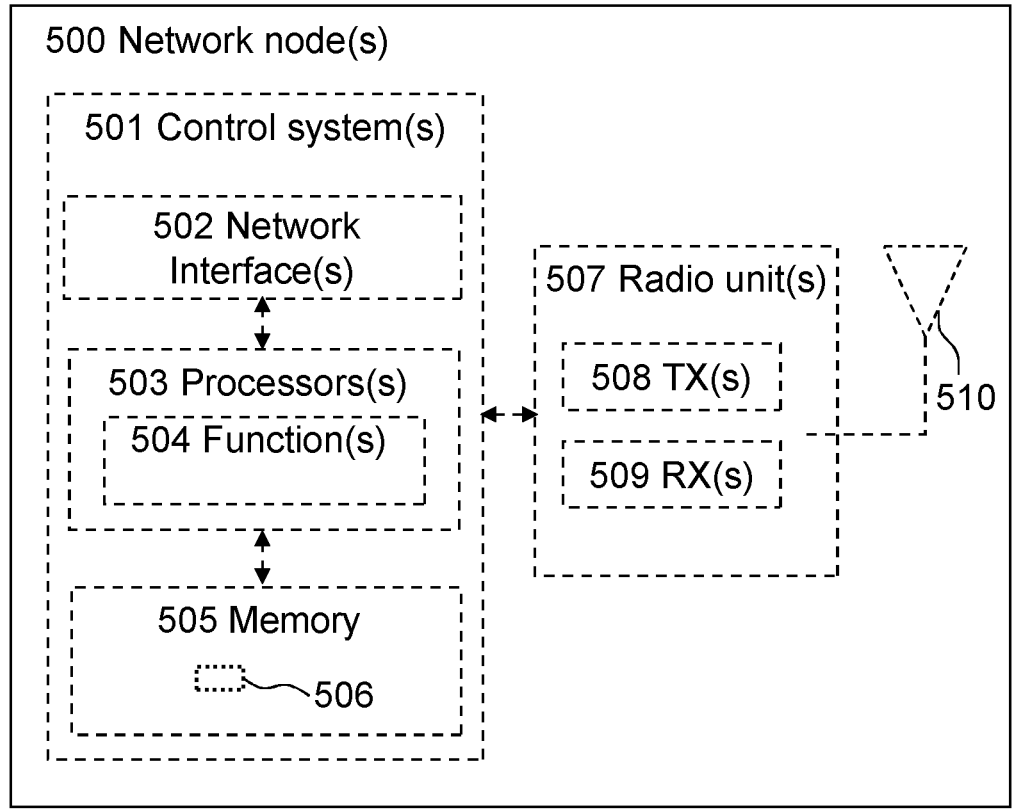
FIGS. 5a-c are schematic block diagrams for illustrating various embodiments of one or more network nodes.
Figure 5B:
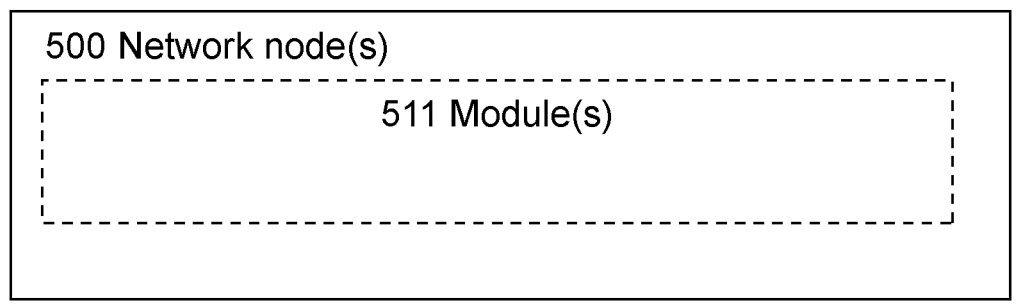
Figure 5C:
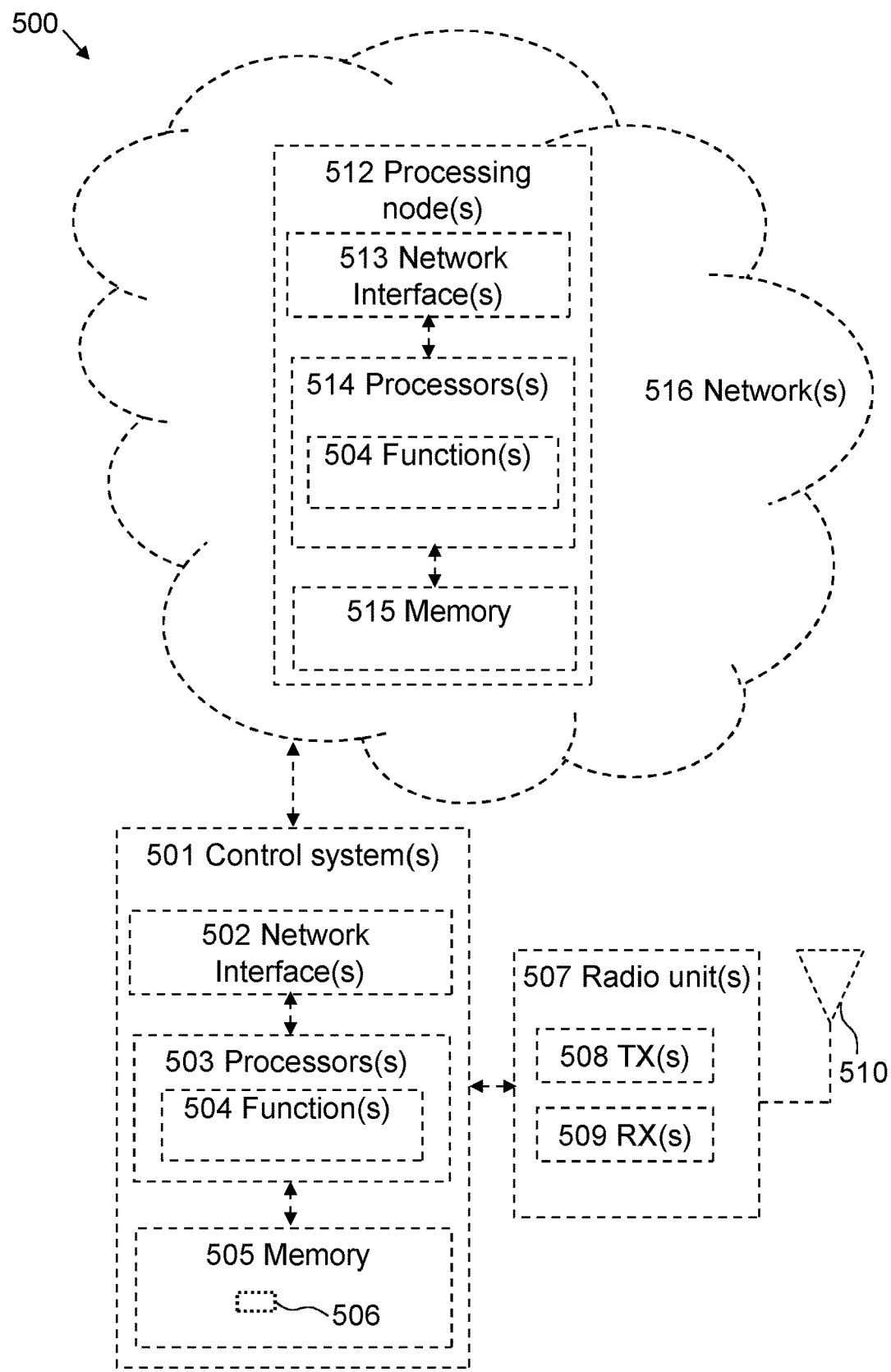

FIGS. 5a-c are schematic block diagrams for illustrating various embodiments of one or more network nodes 500, e.g. one or more of the network nodes 120a-c; 210a-c. The one or more network nodes 500 are thus configured to be operative in a wireless communication network, e.g. any one of the wireless communication networks 100, 200.

The one or more network nodes 500 may be further configured to serve a wireless device, e.g. any one of the wireless devices 120a-c, 220 via a serving cell, e.g. any one of the cells 115a-c, 215a-c, and/or a plurality of neighboring cells. In some embodiments the one or more network nodes is a base station, e.g. any one of the network nodes 120a-c, 210a-c being a base station that may be one of said base stations providing the serving cell for the wireless device.

The figures are particularly for illustrating how the said one or more network nodes, and thereby also any one of the wireless communication networks 100, 200 may be configured to perform the method and actions discussed above in connection with FIG. 4.

As illustrated in FIG. 5a, in some embodiments, the network node(s) 500 may include one or more control systems 501 that may include circuitry comprising one or more processors 503, e.g., Central Processing Units (CPU(s)), Application Specific Integrated Circuit(s) (ASIC(s)) and/or Field-Programmable Gate Array(s) (FPGA(s)), and/or the like, and a memory 505, that may comprise one or more memory units. The control system(s) 501 may also include one or more network interfaces 502. In embodiments in which the network node(s) 500 is a radio access node, the network node 500 may include one or more radio units 507 that each include one or more transmitters 508 and one or more receivers 509 coupled to one or more antennas 510. In some embodiments, the functionality of the network node(s) 500 described above may be fully or partially implemented in software that is, e.g., stored in the memory 505 and executed by the processor(s) 503 that thus may execute functions 504. Memory 505 may comprise both volatile and non-volatile memory for storing computer program code and data needed by the processor(s) 503 for operation. The memory 505 may comprise any tangible, non-transitory computer-readable storage medium for storing data including electronic, magnetic, optical, electromagnetic, or semiconductor data storage. The memory 505 may store a computer program 506 comprising executable instructions that configure the processor(s) 503 to implement methods and actions described herein, such as above in relation to FIG. 4. In general, computer program instructions and configuration information may be stored in a non-volatile memory, such as a Read Only Memory (ROM), Erasable Programmable Read Only Memory (EPROM) or flash memory. Temporary data generated during operation may be stored in a volatile memory, such as a Random Access Memory (RAM). In some embodiments, the computer program 506 for configuring the processor(s) 503 as herein described may be stored in a removable memory, such as a portable compact disc, portable digital video disc, or other removable media. The computer program 506 may also be embodied in a carrier such as an electronic signal, optical signal, radio signal, or computer readable storage medium.

As illustrated in FIG. 5b, in some embodiments the network node 500 includes one or more modules 511, each of which may be implemented in software. The module(s) 511 provide the functionality of the network node 500 described herein, such as above in relation to FIG. 4. The module(s) 511 may include sub-modules operable to perform methods, actions and/or tasks described herein.

As illustrated in FIG. 5c, some embodiments correspond to "virtualized embodiments" of the network node 500. As used herein, a "virtualized" network node 500 can be considered the network node 500 in which at least a portion of the functionality of the network node 500 is implemented as a virtual component, e.g. via virtual machine(s) executing on a physical processing node(s) in network(s). As illustrated, the network node 500 may include the control system 501, as described with respect to FIG. 5a. In addition, if the network node 500 is a radio access node, e.g. base station, the network node 500 typically also includes one or more radio units 506, e.g. as described with respect to FIG. 5a. The control system 501, if present, may be connected to one or more processing nodes 512 coupled to or included as part of network(s) 517, that thus may be external from such wireless communication network that the network node 500 is configured to mainly operate in, via the network interface 502. Alternatively, if the control system 501 is not present, the one or more radio units 506, if present, may be connected to the one or more processing nodes 512 via network interface(s) of e.g. the radio units 506. Alternatively, all of the functionality of the network node 500 described herein, e.g. as above in relation to FIG. 4, may be implemented in the processing node(s) 512, i.e. the network node 500 may in some embodiments not include the control system 501 or the radio unit(s) 506. Each processing node 512 may include one or more processors 514, e.g CPUs, ASICs, FPGAs, and/or the like, a memory 516, and network interface(s) 513.

Functions of the network node 500 described herein, e.g. functions 504, may be implemented at the one or more processing nodes 512 or distributed across the control system 501, if present, and the one or more processing nodes 512 in any desired manner. In some embodiments, some or all of the functions 504 of the network node 500 described herein are implemented as virtual components executed by one or more virtual machines implemented in a virtual environment(s) hosted by the processing node(s) 512. As will be appreciated by one of ordinary skill in the art, additional signaling or communication between the processing node(s) 512 and the control system 501, if present, or alternatively the radio unit(s) 506, if present, may be used in order to carry out at least some of desired functions, e.g. functions 504. Notably, in some embodiments, the control system 501 may not be included, in which case the radio unit(s) 506, if present, may communicate directly with the processing node(s) 512 via appropriate network interface(s).

In some embodiments, a computer program including instructions which, when executed by the at least one of the processors 503, 514, causes the at least one processor 503, 514 to carry out the functionality of the network node 500 or a processing node 512 according to any of the embodiments described herein is provided. In some embodiments, a carrier containing the aforementioned computer program product is provided. The carrier may be one of an electronic signal, an optical signal, a radio signal, or a computer readable storage medium, e.g., a non-transitory computer readable medium such as the memory 515 or the like.

When the network node(s) 500 is a base station, it may comprise a communication interface, e.g. corresponding to or comprising said radio unit(s) 507. It may further comprise a computational circuitry, e.g. corresponding to or comprising said one or more processor(s) 503, 514. The computational circuitry is typically in operative communication with the memory and/or the communication interface.

Therefore, according to the various embodiments described above, any one of said wireless communication networks 100, 200 and/or the one or more network nodes 500 and/or the communication interface and/or the radio units(s) 507 and/or the module(s) 511 may be operative, or configured, to communicate with the wireless device, e.g. any one of the wireless devices 110a-c, 220, to instruct to report said one or more metrics of wireless device parameters. Similar as above regarding FIG. 4, the wireless communication network 200 and the wireless device 220 will in the following be used as examples to simplify.

Further, according to the various embodiments described above, the wireless communication network 200 and/or the network node(s) 500 and/or the communication interface and/or the radio units(s) 507 and/or the module(s) 511 may be operative, or configured, to receive from the wireless device 220 said report of the metrics and/or the memory 505 and/or 515 may be configured to store the report.

Moreover, according to the various embodiments described above, the wireless communication network 200 and/or the network node(s) 500 and/or the computational circuitry and/or one or more of the processor(s) 503, 514 and/or the module(s) 511 may be operative, or configured, to compare the reported metrics to terrestrial metrics to determine whether the wireless device 220 is aerial.

According to some of the various embodiments described above, the wireless communication network 200 and/or the network node(s) 500 and/or the computational circuitry and/or one or more of the processor(s) 503, 514 and/or the module(s) 511 may be operative, or configured, to calculate said time adjustment value of the wireless device 220 and compare the time adjustment value of the wireless device 220 with said maximum terrestrial cell value to determine if the wireless device 220 is aerial.

Furthermore, according to some of the various embodiments described above, the wireless communication network 200 and/or the network node(s) 500 and/or the computational circuitry and/or one or more of the processor(s) 503, 514 and/or the module(s) 511 may be operative, or configured, to monitor said specified parameter level in said one or more cells, detect whether the parameter level exceeds said certain threshold and configure said reporting for wireless devices.

Also, according to some of the various embodiments described above, the wireless communication network 200 and/or the network node(s) 500 and/or the computational circuitry and/or one or more of the processor(s) 503, 514 and/or the module(s) 511 may be operative, or configured, to set said overload indicator.

Note that systems, networks, apparatuses, nodes, devices etc implementing embodiments herein typically comprise more and/or other components than exemplified above. Additionally, operations, methods and actions of embodiments herein may be performed using any suitable logic comprising software, hardware, and/or other logic. As used in this document, "each" refers to each member of a set or each member of a subset of a set. Similarly, methods disclosed for embodiments herein may include more, fewer, or other steps than indicated. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the claims below.

The Background section of this document is provided to place embodiments of the present disclosure in technological and operational context, to assist those of skill in the art in understanding their scope and utility. Unless explicitly identified as such, no statement herein is admitted as prior art merely by its inclusion in the Background section For simplicity and illustrative purposes, the present disclosure is described by referring to exemplary embodiments. In the description above, numerous specific details have been set forth in order to provide a thorough understanding of the present disclosure. However, it will be readily apparent to one of ordinary skill in the art that the present disclosure may be practiced without limitation to these specific details. In this description, well known methods and structures have not been described in detail so as not to unnecessarily obscure the present disclosure. In other instances, well-known circuits, structures, and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments, whether explicitly described.

Particular embodiments are described with reference to the drawings, like numerals being used for like and corresponding parts of the various drawings.

The embodiments presented above represent information to enable those skilled in the art to practice the embodiments. Upon reading the following description in light of the accompanying figures, those skilled in the art will understand the concepts of the disclosure and will recognize applications of these concepts not particularly addressed herein.

As used herein, a "radio node" is e.g. either a radio access node or a wireless device.

As used herein, a "radio access node" is any node in a radio access network of a cellular communications network that operates to wirelessly transmit and/or receive signals. Some examples of a radio access node include, but are not limited to, a base station (e.g., an enhanced or evolved Node B, i.e. eNB, in a Third Generation Partnership Project (3GPP) Long Term Evolution (LTE) network or a gNB in a 3GPP New Radio (NR) network, a high-power or macro base station, a low-power base station, e.g., a micro base station, a pico base station, a home eNB, or the like, and a relay node.

As used herein, a "core network node" is any type of node in a core network of a wireless communication network, such as discussed herein. Some examples of a core network node include, e.g., a Mobility Management Entity (MME), a Packet Data Network (PDN) Gateway (P-GW), a Service Capability Exposure Function (SCEF), or the like.

As used herein, a "network node" is any node that is either part of the radio access network or the core network of a cellular communications network/system.

As used herein, a "wireless device" is any type of device that has access to, e.g. is able to be served by, a cellular communications network by wirelessly transmitting and/or receiving signals to radio access node(s) thereof. Some examples of a wireless device include, but are not limited to, a User Equipment device (UE) in a 3GPP network and a Machine Type Communication (MTC) device.

Each of the terms "wireless device", "user equipment" and "UE", as may be used herein, may as such refer to any type of wireless device arranged to communicate with a radio network node in a wireless, cellular and/or mobile communication system, and may thus be referred to as a wireless communication device. Examples include: target devices, device to device UE, device for Machine Type of Communication (MTC), machine type UE or UE capable of machine to machine (M2M) communication, Personal Digital Assistant (PDA), iPAD, Tablet, mobile, terminals, smart phone, Laptop Embedded Equipment (LEE), Laptop Mounted Equipment (LME), Universal Serial Bus (USB) dongles etc.

Note that while the description given herein may focus on 3GPP wireless networks and/or cellular communications system and, as such, 3GPP LTE terminology or terminology similar to 3GPP LTE terminology is oftentimes used, the concepts disclosed herein are not limited to LTE or a 3GPP system. For example, LTE and NR may be used throughout this disclosure as example wireless communication networks and cellular systems, but the ideas presented herein may apply to other wireless communication systems as well. In general, although terminology used herein may be particularly associated with and/or exemplified by certain communication systems or networks, this should as such not be seen as necessarily limiting the scope of the embodiments herein to only such certain systems or networks etc.

As used herein, the term "memory" may refer to a data memory for storing digital information, typically a hard disk, a magnetic storage, medium, a portable computer diskette or disc, flash memory, random access memory (RAM) or the like. Furthermore, the memory may be an internal register memory of a processor.

Also note that any enumerating terminology such as first node, second node, first base station, second base station, etc., should as such be considered non-limiting and the terminology as such does not imply a certain hierarchical relation. Without any explicit information in the contrary, naming by enumeration should be considered merely a way of accomplishing different names.

As used herein, the expression "configured to" may mean that a processing circuit is configured to, or adapted to, by means of software or hardware configuration, perform one or more of the actions described herein.

As used herein, the terms "number" or "value" may refer to any kind of digit, such as binary, real, imaginary or rational number or the like. Moreover, "number" or "value" may be one or more characters, such as a letter or a string of letters. Also, "number" or "value" may be represented by a bit string.

As used herein, the expression "may" and "in some embodiments" has typically been used to indicate that the features described may be combined with any other embodiment disclosed herein.

In the drawings, features that may be present in only some embodiments are typically drawn using dotted or dashed lines.

As used herein, the expression "transmit" and "send" are typically interchangeable. These expressions may include transmission by broadcasting, uni-casting, group-casting and the like. In this context, a transmission by broadcasting may be received and decoded by any authorized device within range. In case of unicasting, one specifically addressed device may receive and encode the transmission. In case of group-casting, e.g. multicasting, a group of specifically addressed devices may receive and decode the transmission.

When using the word "comprise" or "comprising" it shall be interpreted as nonlimiting, i.e. meaning "consist at least of".

The embodiments herein are not limited to the above described preferred embodiments. Various alternatives, modifications and equivalents may be used. Therefore, the above embodiments should not be taken as limiting the scope of the present disclosure, which is defined by the appending claims.

The invention claimed is:

1. A method, for use in at least one network node of a wireless communication network, for determining whether a first wireless device is aerial, the method comprising:
   monitoring a specified parameter level in at least one cell provided by the at least one network node, the specified parameter level being at least a Reference Signal Received Power (RSRP) parameter level;
   communicating with the first wireless device to instruct the first wireless device to report at least one metric of wireless device parameters;
   receiving from the first wireless device a report of the at least one metric;
   comparing the reported at least one metric to at least one terrestrial metric and the specified parameter level to a specified parameter level threshold;
   detecting whether the specified parameter level exceeds the specified parameter level threshold within the at least one cell;
   configuring reporting for a plurality of wireless devices, including the first wireless device, served by the at least one cell;
   setting an overload indicator to signal to at least one cell of at least one base station to detect whether the plurality of wireless devices, including the first wireless device, are aerial; and
   detecting whether the first wireless device is aerial based at least on:
      the comparing of the reported at least one metric to the at least one terrestrial metric and the specified parameter level to the specified parameter level threshold; and
      the setting of the overload indicator.

2. The method as claimed in claim 1, wherein the at least one network node is a base station.

3. The method as claimed in claim 2, wherein the at least one metric reported by the first wireless device include an estimation of Time-of-Arrival, "ToA", of the first wireless device to the base station.

4. The method as claimed in claim 2, wherein the method further comprises:

calculating a time adjustment value of the first wireless device with regards to the base station, and wherein the comparing further comprises comparing the time adjustment value of the first wireless device with a maximum terrestrial cell value to determine if the first wireless device is aerial.

5. The method as claimed in claim 1, wherein the specified parameter level is a rise-over-thermal level.

6. The method as claimed in claim 1, wherein the specified parameter level is a spectral efficiency parameter level.

7. The method as claimed in claim 1, wherein the specified parameter level is at least one of the Reference Signal Received Power, "RSRP", parameter level and a Reference Signal Received Quality, "RSRQ", parameter level.

8. The method as claimed in claim 1, wherein the at least one metric reported by the first wireless device include at least one of: a handover history, a handover frequency, a doppler estimation, a Channel State Information, "CSI-RI", resource indicator, and an Observed Time Difference of Arrival, "OTDOA", measurement.

9. At least one network node configured to be operative in a wireless communication network and further configured to:
monitor a specified parameter level in at least one cell provided by the at least one network node, the specified parameter level being at least a Reference Signal Received Power (RSRP) parameter level;
communicate with a first wireless device to instruct the first wireless device to report at least one metric of wireless device parameters;
receive from the first wireless device a report of the at least one metric;
compare the reported at least one metric to at least one terrestrial metric and the specified parameter level to a specified parameter level threshold;
detect whether the specified parameter level exceeds the specified parameter level threshold within the at least one cell;
configure reporting for a plurality of wireless devices, including the first wireless device, served by the at least one cell;
set an overload indicator to signal to at least one cell of at least one base station to detect whether the plurality of wireless devices, including the first wireless device, are aerial; and
detect whether the first wireless device is aerial based at least on:
the comparing of the reported at least one metric to the at least one terrestrial metric and the specified parameter level to the specified parameter level threshold; and
the setting of the overload indicator.

10. The at least one network node as claimed in claim 9, wherein the at least one network node is further configured to serve the first wireless device via a serving cell and a plurality of neighboring cells.

11. The at least one network node as claimed in claim 9, wherein the at least one network node is a base station.

12. The at least one network node as claimed in claim 11, wherein the at least one metric reported by the first wireless device include an estimation of Time-of-Arrival, "ToA", of the first wireless device to the base station.

13. The at least one network node as claimed in claim 11, wherein the at least one network node is further configured to:
calculate a time adjustment value of the first wireless device with regards to the base station, and wherein the comparing further comprises comparing the time adjustment value of the first wireless device with a maximum terrestrial cell value to determine if the first wireless device is aerial.

14. The at least one network node as claimed in claim 9, wherein the specified parameter level is a rise-over-thermal level.

15. The at least one network node as claimed in claim 9, wherein the specified parameter level is a spectral efficiency parameter level.

16. The at least one network node as claimed in claim 9, wherein the specified parameter level is at least one of the Reference Signal Received Power, "RSRP", parameter level and a Reference Signal Received Quality, "RSRQ", parameter level.

17. The at least one network node as claimed in claim 9 wherein the at least one metric reported by the first wireless device includes at least one of: a handover history, a handover frequency, a doppler estimation, a Channel State Information, "CSI-RI", resource indicator, and an Observed Time Difference of Arrival, "OTDOA", measurement.

* * * * *